Patented July 11, 1950

2,514,473

UNITED STATES PATENT OFFICE 2,514,473

AMIDES OF FLUORINATED PROPIONIC ACIDS

David W. Chaney, Nether Providence Township, Delaware County, Pa., assignor to American Viscose Corporation, Wilmington, Del., a corporation of Delaware No Drawing. Application June 4, 1948, Serial No. 31,206

3 Claims. (Cl. 260—561)

This invention relates to amides of fluorinated propionic acids of the general formula

CF$_2$XCCIXCOONH$_2$ in which X is selected from the group consisting of fluorine and chlorine.

This application is a continuation-in-part of my pending application, Serial No. 680,055, filed June 28, 1946, now Patent No. 2,456,768.

The new fluorinated amides are obtained from corresponding fluorinated propionyl chlorides or fluorides by reaction of the halide with ammonia.

The fluorinated propionyl halides are obtained by oxidizing propylenes of the formula CF$_2$XCX=CCl$_2$ by passing a stream of oxygen, preferably mixed with a small amount of chlorine gas as catalyst for the reaction, into a vessel containing the propylene and equipped with suitable stirring means and a source of internal actinic radiation such as a mercury vapor lamp encased in a quartz tube extending into the vessel. The gas is passed in until the acyl halide is formed, as indicated by a marked decrease in the gas absorption rate, and usually for a time varying from 50 hours to 120 hours, depending upon the propylene being oxidized, and other conditions such as the efficiency of stirring, the concentration of chlorine used, and the intensity of the radiation.

The temperature at which the oxidation is conducted may vary somewhat, depending upon the boiling point of the propylene being oxidized and the solubilities of the gases therein, which decrease with increasing temperature, but is preferably maintained within the range of from about 30° to 80° C., the reaction vessel being externally cooled to dissipate the heat of the actinic radiation source.

The reaction of oxygen with the propylenes of the type under consideration apparently results in the formation of an intermediate oxide of the general formula

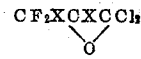

where X has the same significance as above, which by rearrangement involving a shift of a halogen atom from one carbon to another, is converted to the corresponding acyl halide. Most unexpectedly, this shift of a halogen atom and rearrangement to form the acid halide takes place, in the case of the propylenes under consideration, not only with respect to chlorine, but under the conditions described herein, with respect to the perhalogenated methyl group. Thus, when 1,1,3 - trichloro - 2,3,3 - trifluoro - propene-1 (CF$_2$ClCF=CCl$_2$) is oxidized, the oxidation product comprises both the acid chloride (CF$_2$ClCFClCOCl)

and the acid fluoride (CF$_2$ClCCl$_2$COF), the former due to a shift of the chlorine atom, the latter due to a shift of CF$_2$Cl, the rearrangement taking place according to the following scheme:

*First step—Oxidation*

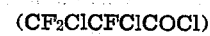

*Second step—Rearrangement*

(1) Shift of chlorine

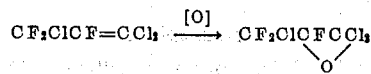

(2) Shift of substituted methyl group

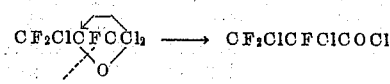

The oxide or mixture of oxides present in the reaction product may be converted to the acyl chloride or mixture of acyl chloride and acyl fluoride by treatment with an amine such as pyridine or, in the case of non-fluorine containing compounds, by treatment with Friedel-Crafts type salts.

The new fluorinated amides may be obtained by treating the oxidation reaction product directly with ammonia, or the acyl halides may be separated from the oxidation reaction mixture prior to treating them with ammonia, if desired. The amides are useful as intermediates in various chemical processes. For example, the amides may be dehydrated to produce fluorinated acrylonitriles capable of forming ethers by direct addition of an alcohol to the double bond.

The following examples in which the parts are by weight will serve to illustrate the invention.

*Example I*

The apparatus used was a three-neck flask equipped with a stirring device, thermometer, gas inlet, reflux condenser, and a source of internal actinic radiation comprising an 80 watt mercury vapor lamp encased in a quartz tube extending into the flask. About 2,785 parts of 1,1,2,3-tetrachloro-3,3-difluoro-propene-1, (CF$_2$ClCCl=CCl$_2$), were placed in the flask and a mixture of oxygen and chlorine in a 10:1 ratio was passed into the flask with constant stirring of the flask contents. The temperature was held at 45–60° C., the flask being cooled by means of running water. At the start, the gases were absorbed at a rate of 50 ml./min. After about 20 hours, the absorption rate had dropped to about 10 ml./min. and the reaction was terminated.

The reaction liquid comprises primarily α-dichloro-β-difluoro-chloropropionyl chloride, $$CF_2ClCCl_2COCl$$

and an oxide believed to be

The crude oxidation product obtained was diluted with dry ether, and dry ammonia was passed into the mixture. The reaction was exothermic and the mixture was maintained at a temperature below 20° C. by cooling it with ice water, and continuous stirring. The insoluble ammonium salts which precipitated were filtered off and repeatedly extracted with ether. Upon evaporation of the combined ether filtrate and extracts a sticky solid separated which was dried under vacuum. On distillation under vacuum α-dichloro-β-difluorochloropropionamide $$(CF_2ClCCl_2CONH_2)$$

was obtained, B. P. 135–148°/29 mm., M. P., 57–58.5° C.

Example II 100 parts of the amide described in Example I in powdered form, were intimately mixed in a flask with 150 parts of powdered phosphorous pentoxide and the mixture was heated to 150–160° C. in an oil bath. The nitrile was distilled off as it formed. At the end of five hours, the temperature was allowed to rise to 210° C. 84 parts of distillate were collected in a receiver cooled by ice, washed with dilute sodium bicarbonate, then with water, dried over sodium sulfate and distilled. All of the product distilled between 91–95° C. A pure sample of α-dichloro-β-difluorochloropropionitrile had a boiling point of 95° C., freezing point −32.5° C., and refractive index $$N_D^{23°} = 1.3990.$$

Example III

In an apparatus as described in Example I, 4730 parts of 1,1,3-trichloro-2,3,3-trifluoropropene-1 ($CF_2ClCF=CCl_2$) were photo-oxidized as described in Example I to a mixture consisting primarily of α-chlorofluoro-β-difluorochloropropionyl chloride ($CF_2ClCFClCOCl$), α-dichloro-β-difluorochloropropionyl fluoride ($CF_2ClCCl_2COF$), and an oxide believed to be

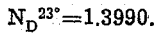

The reaction mixture also comprised some unoxidized starting material, some chlorinated product, and by-products resulting from more complete oxidation and degradation, including $COCl_2$, CO, and $CF_2ClCOCl$. The temperature during the reaction was maintained at about 35° C. The 10 to 1 mixture of gaseous oxygen and chlorine gas was absorbed at the rate of 300 ml./min. When the absorption rate dropped to about 50 ml./min., which required about 30 hours, the reaction was terminated.

The contents of the flask were then slowly heated to about 50° C. to remove dissolved chlorine gas and low-boiling by-products.

The crude reaction mixture was diluted with 1500 parts of dry ether, cooled to 10° C., and dry ammonia was passed into the mixture with constant stirring. The reaction between the acid halides and ammonia was exothermic, the temperature being maintained at below 20° C. by external cooling. After about 8 to 10 hours, the acid halides were converted to the corresponding amides and insoluble ammonium halides. The insoluble halides were filtered off, and extracted with ether. The filtrate and ether extracts were combined, and dried finally under vacuum. 2710 parts of a mixture of amides consisting of α-chlorofluoro-β-difluorochloropropionamide and α-dichloro-β-difluorochloropropionamide were obtained.

Example IV 100 parts of the amides obtained in accordance with the procedure described in Example III, in finely powdered condition were intimately mixed with 150 parts of powdered phosphorous pentoxide in a round-bottom flask. The mixture was heated to 160–180° C. in an oil bath. At that temperature, the product began to distil over. Heating was continued for about four hours, the temperature being finally raised to 200° C. About 76 parts of crude distillate were obtained. The distillate was washed twice with ice water, dried over anhydrous sodium sulfate, and distilled. At 46–56° C., 22 parts of α-chlorofluoro-β-difluorochloropropionitrile ($CF_2ClCFClCN$) distilled over. B. P. 51.5° C., $N_D^{23°}$ 1.3436, $d^{23°}$ 1.4360. At 90–97° C., 20 parts of α-dichloro-β-difluorochloropropionitrile ($CF_2ClCCl_2CN$), were obtained, B. P. 95.5° C., freezing point −33° C., $N_D^{23°}$ 1.3991, $d^{23°}$ 1.5171.

I claim:

1. Amides of fluorinated propionic acids of the formula $CF_2ClCClXCONH_2$ where X is selected from the group consisting of fluorine and chlorine.

2. Alpha, alpha - dichloro-beta,beta-difluoro-beta-chloropropionamide.

3. Alpha chloro, alpha fluoro-beta,beta-difluoro-beta-chloropropionamide.

DAVID W. CHANEY.

REFERENCES CITED

The following references are of record in the file of this patent:

UNITED STATES PATENTS

| Number | Name | Date |
| --- | --- | --- |
| 2,292,129 | Kirkbride | Aug. 4, 1942 |
| 2,332,302 | D'Alelio | Oct. 19, 1943 |
| 2,409,315 | Rigby et al. | Oct. 15, 1946 |
| 2,426,891 | Lynch | Sept. 2, 1947 |
| 2,427,624 | Rushmer et al. | Sept. 16, 1947 |
| 2,438,200 | Behr et al. | Mar. 23, 1948 |
| 2,439,505 | Chaney | Apr. 13, 1948 |
| 2,456,768 | Chaney | Dec. 21, 1948 |

OTHER REFERENCES

Richters Organic Chemistry, vol. 1 (1944), page 321.